July 21, 1959    F. J. WINCHELL    2,895,578
SPRING CLUTCH
Filed Sept. 10, 1956
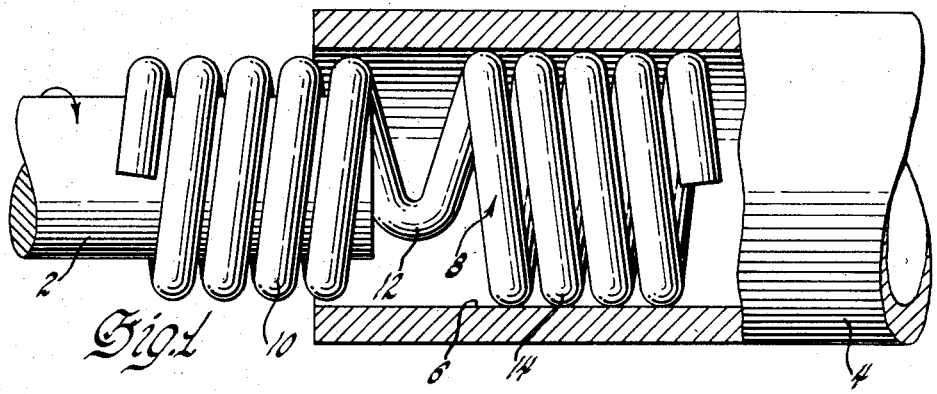
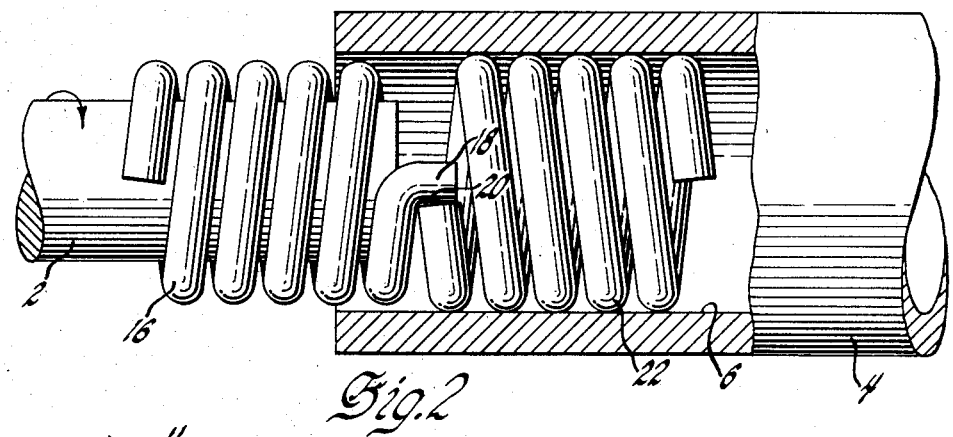
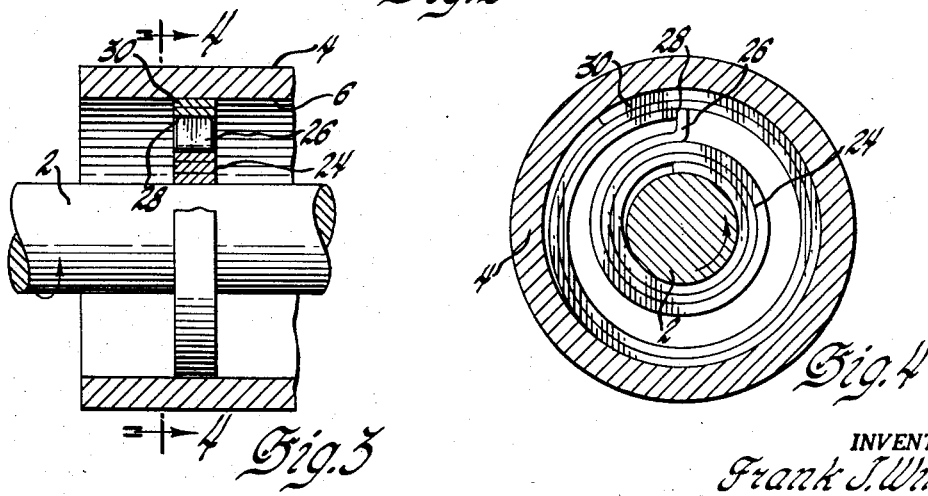
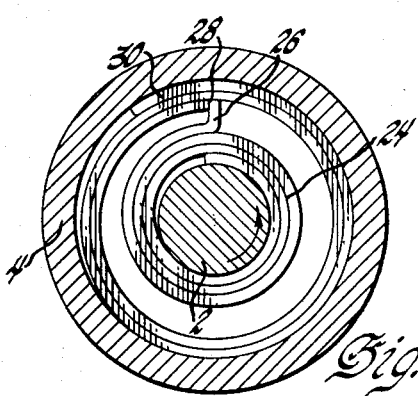
INVENTOR.
Frank J. Winchell
BY
R. P. Barnard
ATTORNEY

United States Patent Office 2,895,578
Patented July 21, 1959

---

2,895,578

SPRING CLUTCH

Frank J. Winchell, Franklin Village, Mich., assignor to General Motors Corporation, Detroit, Mich., a corporation of Delaware Application September 10, 1956, Serial No. 608,953

5 Claims. (Cl. 192—41)

The present invention relates to an improvement in a spring clutch or drive interconnecting two substantially coaxial members to conduct one-way direct drive therebetween.

As is known to those skilled in the art, spring clutches obviate the necessity for splining or broaching the coaxial members between which drive is to be transmitted thereby resulting in an efficient, inexpensive drive connection. Moreover, the elimination of splined connections and substitution therefor of a spring clutch for the transmission of drive results in greater ease of assembly inasmuch as there are no splined or keyed parts to be mated.

It is an object of this invention to provide a simple, inexpensive and easily assembled spring clutch for drivingly interconnecting two coaxial members.

It is a further object of this invention to provide a spring clutch for the transmission of drive between two coaxial shafts which does not require any fixed mounting to either of the two shafts in assembly.

It is a more particular object of this invention to provide a spring clutch comprising at least two sections, one being contractible while the other is expansible to establish a frictional drive transmission relationship between a drive shaft and the hollow bore of a driven shaft.

It is a specific object of this invention to provide a spring clutch or drive transmission mechanism embodying a coiled spring wound about a driving shaft in one direction to frictionally engage said shaft upon rotary motion thereof, and having a reversely wound section disposed within the hollow bore of a driven shaft whereby the second section will expand into frictional engagement with the bore upon contraction of the first spring section.

These and other objects and advantages will become more readily apparent as the description of the invention proceeds, reference being made therein to the accompanying drawing, in which like numerals in the various figures thereof refer to like parts, and in which:

Figure 1 is a longitudinal cross-sectional view of one embodiment of the spring clutch of this invention;

Figure 2 is a longitudinal cross-sectional view of another form of the spring clutch shown in Figure 1;

Figure 3 is a longitudinal cross-sectional view of a third form of the spring clutch;

Figure 4 is a sectional view taken on the lines 4—4 of Figure 3.

Referring now to the drawing and to Figure 1 in particular, there is disclosed a driving shaft 2 and a driven shaft 4 substantially coaxially mounted with respect to each other, the shaft 4 having a hollow bore 6. An integral, axially, helically coiled spring clutch 8 comprises a first section 10 wound in one direction about the external surface of the driving shaft 2, a reverse bend 12 and a second section 14 wound in a direction opposite to that of the first section and disposed within the hollow bore 6 of driven shaft 4. Preferably, the respective spring sections have coil diameters permitting easy installation on and within the respective shafts while being in sufficiently close proximity with respect to the external surface of the driving shaft and the surface of the hollow bore of the driven shaft so as to frictionally engage said shafts upon rotation of the driving shaft.

In the spring clutch transmission mechanism shown in Figure 1, clockwise rotation of the driving shaft 2 will result in contraction of the coils of the first spring section 10 about the external surface of the driving shaft thereby causing expansion of the coils of the second spring section 12 which frictionally seize the annular side wall of the hollow bore 6 to transmit drive. Although it may not be a required feature in a particular environment in which this invention is employed, it will be apparent that this structure will also permit overrunning of the driven shaft 4. Upon shaft 4 overrunning the shaft 2, frictional engagement of the bore 6 with the coil section 12 will result in unwinding of the spring section 10 from the shaft 2 and relaxation of the entire integral clutch spring. Upon torque again being supplied by the driving shaft to the driven shaft, the spring will again frictionally interconnect the two shafts to lock them against relative rotation thereby transmitting one-way direct drive.

In the form of the invention shown in Figure 2, a contractible coil spring 16 is wound about the external surface of the driving shaft 2 in one direction and terminates in an axially extending tang 18 which abuts the end face 20 of the coil spring 22 disposed within the hollow bore 6 of the driven shaft 4. In this construction, clockwise rotation of the shaft 2 results in contraction of the spring 16 into frictional engagement with the shaft while the coaction of the tang 18 and end face 20 of the springs cause expansion of the spring 22 into frictional driving engagement with the shaft bore 6.

Here again shaft 4 may overrun the shaft 2. As the shaft 4 overruns, the tang 18 and end face 20 move apart thereby relaxing the two coil springs until such time as torque is again supplied by shaft 2 whereby the tang again abuts the spring end face to cause frictional interengagement of the shafts by the spring clutch.

In the form of the invention shown in Figures 3 and 4, substantially flat clock-like springs are employed to transmit drive between the two substantially coaxial shafts. Figures 3 and 4 disclose two separate springs in a manner similar to that shown in Figure 2; however, it will be appreciated that an integral spring as shown in Figure 1 may also be employed.

In the structure shown in Figures 3 and 4, a flat clock-like spring 24 is wound about the driving shaft 2 in one direction and terminates in a radially projecting tang 26 in abutting relationship with the end face 28 of a second spring 30 wound in the opposite direction within the hollow bore 6 of driven shaft 4. The coils of the respective spring sections are in substantially the same plane normal to the common axes of the coaxial shafts thereby permitting receipt of the driving shaft within the hollow bore of the driven shaft.

The driving shaft 2 is shown as rotating counterclockwise in this form of the invention which results in frictional seizure therewith of the contracting first spring and, through the coaction of the tang and spring end face, expansion of the second spring into frictional engagement with the driven shaft 4 to transmit drive. As will be apparent, shaft 4 may overrun shaft 2 as in the embodiment of Figure 2.

With respect to the two-piece spring clutch construction shown in Figures 2 and 3, it will be readily appreciated that any suitable means, such as an annulus, may be mounted on and within, respectively, the driving and driven shafts to cooperate with the springs to maintain them in operative relationship if they should tend to move axially relative to each other.

Thus, it will be seen that I have provided a drive transmission mechanism embodying a simple, inexpensive and easily assembled spring clutch for drivingly interconnecting a driving and hollow driven member without requiring extensive, expensive machining operations on said members, which mechanism is defined in the appended claims.

I claim:

1. A spring clutch to transmit rotary drive between a first shaft and a second substantially coaxial shaft having a hollow bore, said clutch comprising a first spring section including a plurality of continuous coils wound in one direction about said first shaft, a second spring section including a plurality of continuous coils wound in the opposite direction within the hollow bore of said second shaft, and connecting means on adjacent end coils of said first and second spring sections to contract and expand the latter respectively into frictional driving engagement with said first and second shafts upon driving rotation of one of the latter.

2. A spring clutch to transmit rotary drive between a first shaft and a second substantially coaxial shaft axially spaced therefrom and having a hollow bore, said clutch comprising a first spring section including a plurality of continuous axially spaced coils wound in one direction about said first shaft, and a second spring section including a plurality of continuous axially spaced coils wound in the opposite direction within the hollow bore of said second shaft, the adjacent end coils of said first and second spring sections being integrally joined at a location radially spaced from the axis of said shafts for contraction and expansion respectively into frictional driving engagement with said first and second shafts upon driving rotation of one of the latter.

3. A spring clutch to transmit rotary drive between a first shaft and a second substantially coaxial shaft having a hollow bore, said clutch comprising a first spring section including a plurality of continuous coils wound in one direction about said first shaft, a second spring section including a plurality of continuous coils wound in the opposite direction within the hollow bore of said second shaft, and a tang projecting from the end coil of one spring section at a location radially spaced from the axis of said shafts for abutting engagement with the end of the adjacent end coil of the other spring section to contract and expand said first and second spring sections respectively into frictional driving engagement with said first and second shafts upon driving rotation of one of the latter.

4. A spring clutch to transmit rotary drive between a first shaft and a second substantially coaxial shaft axially spaced therefrom and having a hollow bore, said clutch comprising a first spring section including a plurality of continuous axially spaced coils wound in one direction about said first shaft, a second spring section including a plurality of continuous axially spaced coils wound in the opposite direction within the hollow bore of said second shaft, and a tang projecting axially from the end coil of one spring section at a location radially spaced from the axis of said shafts for abutting engagement with the end of the adjacent end coil of the other spring section to contract and expand said first and second spring sections respectively into frictional driving engagement with said first and second shafts upon driving rotation of one of the latter.

5. A spring clutch to transmit rotary drive between a first shaft and a second substantially coaxial shaft having a hollow bore into which said first shaft projects, said clutch comprising a first spring section including a plurality of continuous radial coils wound in one direction about said first shaft, a second spring section including a plurality of continuous radial coils wound in the opposite direction within the hollow bore of said second shaft, the radial coils of the respective spring sections being contained in a common plane substantially normal to the axis of said shafts with the radially innermost coil of said second spring section radially outwardly spaced from the radially outermost coil of said first spring section, and a tang projecting radially inwardly from said innermost coil of said second spring section and being abuttable with the end of said outermost coil of said first spring section to contract and expand said first and second spring sections respectively into frictional driving engagement with said first and second shafts upon driving rotation of one of the latter.

References Cited in the file of this patent

UNITED STATES PATENTS

| 197,177 | Robinson | Nov. 13, 1877 |
| 1,126,780 | Jones | Feb. 2, 1915 |
| 2,742,126 | Morton | Apr. 19, 1956 |

FOREIGN PATENTS

| 44,261 | Sweden | July 10, 1918 |
| 263,041 | Great Britain | Dec. 23, 1926 |